United States Patent [19]

Regnault et al.

[11] 4,199,371

[45] Apr. 22, 1980

[54] PROCESS FOR CONTINUOUS ACID HYDROLYSIS AND SACCHARIFICATION

[75] Inventors: Alain Regnault, Ornex; Jean-Pierre Sachetto, St-Julien-en-Genevois; Herve Tournier, Valleiry, all of France; Thomas Hamm, Le Lignon; Jean-Michel Armanet, Onex, both of Switzerland

[73] Assignee: Battelle Memorial Institute, Carouge-Geneva, Switzerland

[21] Appl. No.: 892,329

[22] Filed: Mar. 31, 1978

[30] Foreign Application Priority Data

Apr. 1, 1977 [CH] Switzerland ........................ 4120/77

[51] Int. Cl.[2] .......................... C13K 1/02; B01F 1/00; B01J 1/00

[52] U.S. Cl. .......................................... 127/37; 127/1; 260/124 R

[58] Field of Search ....................... 127/1, 37; 260/124

[56] References Cited

U.S. PATENT DOCUMENTS

| | | | |
|---|---|---|---|
| 1,670,727 | 5/1928 | Kocher | 127/1 |
| 1,990,097 | 2/1935 | Scholler et al. | 127/37 |
| 2,086,701 | 7/1937 | Dreyfus | 127/37 |
| 2,538,457 | 1/1951 | Hudson | 127/1 X |
| 2,778,751 | 1/1957 | Riehm | 127/37 |
| 2,951,775 | 9/1960 | Apel | 127/37 |
| 3,212,933 | 10/1965 | Hess et al. | 127/37 |

FOREIGN PATENT DOCUMENTS

| | | | |
|---|---|---|---|
| 524156 | 4/1931 | Fed. Rep. of Germany . | |
| 904371 | 11/1945 | France . | |
| 9320 | of 1888 | United Kingdom | 127/1 |
| 681345 | 10/1952 | United Kingdom . | |

*Primary Examiner*—Michael S. Marcus
*Attorney, Agent, or Firm*—Finnegan, Henderson, Farabow, Garrett & Dunner

[57] ABSTRACT

Continuous hydrolysis to produce sugars is effected by cyclically immersing a solid, divided lignocellulosic material in a bath of concentrated hydrochloric acid and draining the material between successive immersions so as to dissolve the produced sugars, until the sugar concentration of the acid in the bath has attained a desired value.

The solid material and the liquid acid are delivered to a tubular horizontal rotary reactor arranged to provide a bath of the acid, to produce a rotating movement for cyclical immersion of the solid material in the bath of acid and longitudinally displace the solid material undergoing hydrolysis together with the acid of the bath and to continuously discharge solid residue and acid containing dissolved sugars due to overflow by gravity at an outlet end of the reactor.

9 Claims, 3 Drawing Figures

PROCESS FOR CONTINUOUS ACID HYDROLYSIS AND SACCHARIFICATION

The present invention relates to the acid hydrolysis and saccharification of lignocellulosic materials in solid, divided form.

In order that the production of sugars starting from plant materials may be carried out by acid hydrolysis with a yield which is of economic interest, it is necessary to ensure good solid/liquid contact, a high reaction rate, good mass transfer, rapid dissolution of the produced sugars and extraction of the dissolved sugars.

When using a vertical column for acid hydrolysis, it is fairly difficult to cause the plant material (of low density) to move at a controllable velocity along the hydrolysis column, in order to be able to control the duration of the hydrolysis. The solid materials also have a tendency to form arches upstream from the lower outlet of the column and these arches have to be eliminated by mechanical means which increase the complexity of the auxiliary equipment necessary for a hydrolysis column.

The use of vertical columns, according to known hydrolysis processes, also presents great limitations with regard to the dimensions of the plant materials which can be treated in a satisfactory manner and it is often necessary to subject the plant raw material to a prior preparation by mechanical means, before subjecting it to the hydrolysis, which results in a notable increase of the overall cost of the products obtained by hydrolysis.

The vertical hydrolysis columns are moreover of great height, which necessitates a relatively expensive reinforced construction.

The purpose of the present invention is to obviate these disadvantages and to permit continuous acid hydrolysis of different plant raw materials to be carried out under conditions which can be easily controlled and adapted to the material to be hydrolyzed and to the desired treatment in each case.

For this purpose, one object of the present invention is a process for producing sugars by continuously hydrolyzing lignocellulosic materials in solid divided form by contact thereof with concentrated liquid hydrochloric acid, comprising the steps of:

(a) cyclically immersing the solid material to be hydrolyzed in a bath of said concentrated acid while removing and draining a part of the solid material between consecutive immersions thereof in the bath, in such a manner that the sugars formed by hydrolysis are dissolved in the acid bath, and (b) repeating the cyclical immersions of the solid material into the bath until the concentration of sugar in the acid attains a desired value.

Another object of the invention is an apparatus suitable for carrying out this process. This apparatus comprises:

(a) a tubular rotary reactor arranged along an essentially horizontal axis with drive means for rotating the reactor at an adjustable speed around this axis, (b) a tubular wall defining the rotary reactor and having an inner surface equipped with a plurality of paddles which project radially and are distributed peripherally and longitudinally along this surface, so as to be able to lift the solid material to be hydrolyzed during rotation of the tubular reactor, (c) a transverse wall defining an inlet end of the tubular rotary reactor and comprising a central inlet for admission of the solid material to be hydrolyzed, the opposite end of the reactor being open so as to form a free outlet of the reactor, (d) a liquid distributor permitting continuous delivery of a predetermined amount of concentrated liquid acid at least in an impregnation zone arranged near said inlet end and equipped with a part of the said paddles, (e) a helical baffle projecting inwards along a predetermined radial distance from the inner surface of said tubular wall and defining a continuous helical channel which is open toward the said horizontal axis, which contains a second part of the said paddles and which extends along a hydrolysis zone situated between the said impregnation zone and the free outlet of the reactor, so that said baffle is capable of maintaining a bath of concentrated acid along the lower part of the tubular reactor and of causing the acid of this bath to advance at the same time as the solid material towards the free outlet due to rotation of the reactor.

Carrying out the present invention in such a tubular horizontal rotary reactor permits hydrolysis to be effected in a particularly simple and easily controllable manner and to thereby ensure the required reaction conditions for each desired treatment.

Controllable amounts of the plant material to be treated and of the concentrated acid necessary for the desired treatment may be respectively supplied to the rotary reactor by means of conventional, simple feeding devices such as an adjustable-speed spiral conveyor for the solid material and a spraying head for the concentrated acid.

The rotating movement of the horizontal tubular reactor equipped with simple internal paddles thus easily ensures complete impregnation of the plant material by contacting and mixing it intimately with the concentrated acid of the bath.

The combined action of the internal paddles and of the helical baffle of the rotary reactor ensures very intimate mixing at the same time as the continuous progression of the plant material and of the acid along the reactor, which advance together due to the action of the helical baffle, while a considerable relative vertical movement is obtained between the solid and liquid phase due to the action of the internal paddles which ensure vertical displacement and draining of the solid material. The acid which drains off from the solid material, flows downward on the internal surface of the reactor and thus percolates through the solid material situated below, which thus undergoes a washing action by the drained acid.

Each time the drained solid material reaches the highest point of its ascending path, it falls back into the concentrated acid bath formed between the turns of the said helical baffle.

The solid material thus follows a helical path along which it is displaced in a well-determined manner by means of the said paddles and helical baffle, which are arranged in such a way as to retain the solid material and the acid reactor in order to undergo thereby prolonged, intimate mixing while producing a slight backmixing, which is, however, limited to each space between two successive turns of the helical baffle.

Due to the rotation of the horizontal tubular reactor, the solid plant material is thus subjected to hydrolysis by a cyclic treatment comprising the following three successive stages:

intimate mixing and complete wetting of the solid plant material by its repeated immersion into an acid bath of relatively small volume formed at the bottom of the reactor;

draining and washing the solid plant material, whereby to extract the sugars formed, to dissolve these sugars in the acid returning to the bath, and to thus promote an effective attack by the acid during the subsequent immersion into the bath:

returning the drained solid plant material to the acid bath, in order to undergo a subsequent immersion and thus recommence the cycle.

Thus, these three stages are carried out successively and cyclically due to the rotation of the horizontal tubular reactor, while the total amount of liquid acid used therein may be reduced in this case to the strict minimum which is necessary on the one hand, to form an acid bath of small volume which permits said repeated immersions in order to carry out the required hydrolysis, and on the other hand, to be able to dissolve the sugars thus formed.

The said cyclically repeated immersions thus permit continuously subjecting successive portions of the solid plant material to very intimate contact with a relatively large amount of acid during each immersion in the bath, while reducing the ratio between the total amounts of acid used and of solid plant material treated in the reactor.

The said cyclic draining and washing of the solid plant material further permits the continuous transfer of sugars formed during hydrolysis from the plant material to the entire acid forming the bath. This ensures rapid mass transfer, by avoiding any substantial accumulation of the said sugars, and also the rapid dissolution of these sugars as soon as they are formed during hydrolysis. The amount of residual sugar which will have to be subsequently separated from the solid hydrolysis product is thereby reduced, the extraction of the sugars from a liquid phase being easier than from a solid phase.

The rotary movement of the said horizontal tubular reactor effects the longitudinal displacement of the solid plant material and hence continuous discharge of the solid hydrolysis products together with the liquid acid containing the dissolved sugars by a simple overflow at the outlet end of the reactor.

The said tubular, horizontal, rotary reactor thus has a particularly simple construction, which permits continuous feeding, intimate mixing, displacement and discharge of the entire solid material and liquid acid, in a predetermined manner which can be controlled via the speed of rotation of the reactor.

In addition to the important practical advantages already described, such a rotary reactor obviates in a very simple manner the necessity of using mechanical devices comprising mobile members which are subject to more or less rapid erosion due to the presence of abrasive materials such as silica in the solid material to be treated, while the complete elimination of such materials by prior treatment would be prohibitive.

In addition, hydrolysis can be carried out at low pressure and low temperature in such a rotary horizontal reactor so that it can be manufactured from a light inexpensive material, which is chemically inert toward the concentrated acid, particularly plastic materials, such as polyolefins, PVC, aromatic polyesters, and reinforced epoxies.

The design and mode of operation of such a horizontal rotary reactor moreover permits the efficient, continuous treatment of a broad variety of divided solid materials of quite different sizes and physical forms, such as for example, sawdust, shavings, chips, twigs or pieces of wood straw, bagasse, etc.

Such a horizontal rotary reactor is thus suitable for a broad range of applications and further permits a considerable saving in the cost of prior preparation of the solid material to be treated.

It allows all desired hydrolysis operations to be continuously effected in a selective manner which is easily controllable as a function of said solid material and the sugars to be obtained.

Thus, for example, selective hydrolysis of the hemicellulose fraction of the solid plant material may be effected advantageously in such a tubular rotary reactor into which hydrochloric acid is fed at a concentration less than 37% by weight, particularly in the range between 25% and 35%, whereby to produce pentoses and a residual lignocellulose fraction in a solid form having preserved essentially the same physical structure as the solid plant material at the inlet of this reactor.

Hydrolysis can also be effected in two successive stages in two such rotary tubular reactors, with one stage for the selective hydrolysis of the hemicellulose fraction of the solid plant material carried out in a first rotary tubular reactor into which this solid material and hydrochloric acid with a concentration more than 30% and less than 37% by weight are fed continuously. At the outlet of this reactor a heterogeneous mixture is discharged consisting of a non-hydrolyzed lignocellulose fraction, mixed with the concentrated acid containing the sugars formed during this stage of selective hydrolysis. The lignocellulose fraction thus obtained can be separated and then washed with hydrochloric acid having a concentration by weight greater than 33% and less than 37%, in order to avoid hydrolyzing the amorphous cellulose fraction; it can next be fed to another rotary tubular reactor which is fed at the same time with hydrochloric acid having a concentration between 39% and 41%. In this way a stage of complete hydrolysis of the lignocellulose fraction is achieved and one then obtains at the outlet of this second reactor a suspension of lignin in the concentrated acid containing the dissolved sugars formed during this stage.

As a variant, the lignocellulosic fraction obtained from said first selective hydrolysis stage may be washed with 35% acid and then hydrolyzed with 37%-39% acid in another rotary reactor, so as to selectively hydrolyze only the amorphous (readily accessible) cellulose fraction, which can attain up to 50% of the total cellulose fraction. The remaining crystalline cellulose fraction may finally be hydrolyzed with 39-41% acid as described.

The ratio between the solid material and the concentrated acid fed continuously into the rotating tubular reactor, the solid/liquid ratio, may be chosen advantageously between 1:5 and 1:10 by weight, particularly in the case of a solid material of low density, such as straw or between 1:3 and 1:10 in the case of sawdust. This may permit large savings in the acid used in carrying out the desired hydrolysis in each case. However, one can use, should the occasion arise, a more important proportion of the liquid for example a solid/liquid ratio up to 1:20.

Moreover at least a part of the concentrated acid used for hydrolysis can be recycled advantageously in the rotary tubular reactor, so as to increase the sugar concentration in the acid up to a predetermined value, whereby to ensure additional savings in acid as well as in the energy consumed in the subsequent recovery of the sugars obtained.

The sugars formed by hydrolysis in the rotary tubular reactor and discharged continuously with the acid leaving the reactor, can be recovered directly by means of any suitable type of evaporator. For this purpose, the mixture which is removed continuously from the rotary tubular reactor is dried, preferably by direct contact with a stream of hot air delivered to the evaporator, so as to recover a powdery mixture comprising lignin and the sugars formed by hydrolysis. The sugars can then be separated from the powdery mixture thus recovered by taking up this mixture in water.

The lignocellulose material to be hydrolyzed can be supplied to the rotary tubular reactor in any appropriately divided form which permits it to undergo an adequate rotating motion, but will be preferably divided into fragments having maximum dimensions at most equal to one eighth of the internal diameter of the tubular reactor. If necessary the solid material to be treated may be first roughly chopped.

Due to the very simple construction and easily controllable operation of such a rotary horizontal reactor it thus becomes possible to largely eliminate in a very simple manner the disadvantages and practical limitations cited above which are generally inherent in hydrolysis reactors used until now.

The possibility of submitting different plant materials to an efficient and easily controllable hydrolysis treatment in such a horizontal rotary reactor considerably broadens the field of applications which can be considered for carrying out the present invention, which thus involves a minimum of technological or economical restrictions.

The detailed description which follows illustrates the various advantages of the present invention.

The invention is explained below in a more detailed manner with reference to examples and the accompanying drawing, in which.

Figure 1:
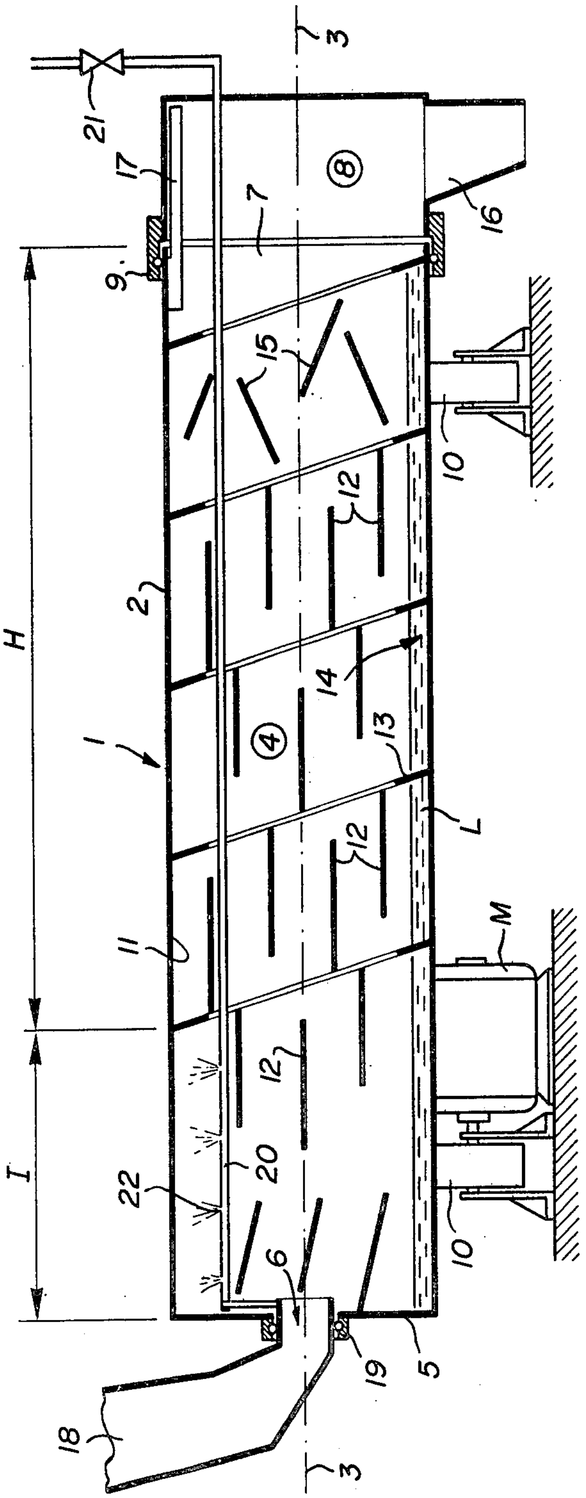
FIG. 1 shows schematically a longitudinal, vertical section of a horizontal tubular rotary reactor according to one embodiment for carrying out the invention.

The rotary reactor 1 represented schematically in a longitudinal, vertical section in FIG. 1, includes a tubular wall 2 rotating around a horizontal axis 3 and defining a cylindrical rotating reaction chamber 4 having an inlet end and an outlet end situated respectively on the left and on the right in FIG. 1. A transverse wall 5 equipped with an axial inlet 6 opening is arranged at the inlet end of the rotating chamber 4, the opposite end thereof being completely open and forming a free opening 7 which opens into a cylindrical discharge chamber 8 fixedly mounted as an extension of the rotating chamber 4, and connected to it by a conventional sealing arrangement 9. This reactor 1 is mounted horizontally on external rollers 10 connected to a conventional drive means M with adjustable speed.

The internal surface 11 of the tubular wall 2 of the reactor is equipped with a number of radial paddles 12 which each extend longitudinally over a portion of the reactor and protrude radially from this surface 11 over a radial distance r 12. As can be seen from FIG. 1, these paddles 12 are distributed longitudinally and peripherally in such a way that they constitute several successive circular rows and are distribute in a staggered arrangement in two successive zones of the reactor, an impregnation zone I and a hydrolysis zone H.

In the hydrolysis zone H, which occupies a major part of the reaction chamber 4, the tubular wall 2 is equipped with the said paddles 12 and, in addition, with an internal helical baffle 13 which protrudes radially from the internal surface 11 over a radial distance r 13 and defines a continuous helical channel 14 which is open towards the axis 3, has a radial height equal to r 13 and extends along the hydrolysis zone H. This zone H further comprises two rows of oblique internal baffles 15 which are disposed in a staggered manner upstream from the outlet 7 and protrude radially from the internal surface 11 of the wall 2, the baffles of the last row being inclined downwards toward the outlet opening 7 of the reactor, the whole arrangement being such as to produce a stream of liquid dripping along a winding path directed toward the bottom in the direction of outlet 7 in order to favor discharge into the fixed evacuation chamber 8, which has a vertical collector 16 at the bottom. A mobile internal scraper 17 is also attached to wall 2 in such a way that it presents a scraping edge arranged so as to wipe the internal cylindrical surface of the fixed discharge chamber 8 and to thus remove any solid material which might adhere to this fixed surface, whereby to ensure complete discharge of all solid residues.

The described rotary reactor according to FIG. 1 is fed continuously with the divided solid material to be treated, through axial inlet opening 6 and may be associated for this purpose with a first feeding device of any appropriate conventional type, which is represented in FIG. 1 only by a fixed feed pipe 18 connected to the inlet 6 by means of a sealing device 19. This first feeding device serves to continuously deliver a controllable amount of solid material to be treated, which may present any appropriate divided form, such that it may be transported continuously from any appropriate source, for example by gravity via a simple controllable distributor, or by mechanical or pneumatic conveyors, such as are currently used for transporting loose solid materials.

The described rotary reactor is also fed continuously with liquid acid having a predetermined concentration and coming from any appropriate source of acid. It may be associated for this purpose with a second feeding device of any appropriate conventional type, which comprises a liquid distributor having in this case a fixed sprinkler tube 20 equipped with a control valve 21, arranged longitudinally in the upper part of the reactor and provided with a series of spray openings 22 at the top. Thus, a part of the sprayed liquid falls directly to the bottom of chamber 2, while another part of the liquid flows downwards along surface 11 and thus follows a winding path around the paddles 12.

The entire sprayed treatment liquid thus descends by gravity in one way or another and thereby forms a liquid bath L (see FIG. 1) on the bottom of the rotating chamber 4, due to the presence of the helical baffle 13 which retains the liquid while making this bath advance progressively along the rotary reactor according to the Archimedes principle.

The mode of operation of the rotary tubular reactor described above and represented in FIG. 1 can be explained as follows:

The divided solid material continuously introduced via the axial inlet 6 into the impregnation zone I, is immersed in the said bath L of the treatment liquid, while a portion of the immersed material is continually carried upwards out of this bath by means of the paddles 12 and is thus subjected to a rotating tumbling movement whereby it undergoes a cyclic immersion into the liquid bath formed at the bottom of rotating chamber 4. During this tumbling movement, the divided solid material is thus removed cyclically from the bath between two successive immersions and thereby undergoes a draining action. The liquid thus drained off, as well as the fresh treatment liquid coming from the sprinkler tube 20, thus exert an efficient washing action on the entire internal surface 11 of the tubular wall and hence on the solid material which is in contact with this surface.

Rotation of the reactor 1 thus provides cyclically repeated immersions with intermediate washings and thereby produces very intimate mixing between the entire divided solid material and treatment liquid of the bath, which are caused to advance progressively along the reactor due to the combined action of the paddles 12 and of the helical baffle 13.

The intimate contact and mixing thus achieved in a very simple manner during rotation of the horizontal tubular reactor, ensure a very efficient and rapid attack of the entire solid material by the liquid of the bath. It thus becomes possible to ensure a very rapid and complete impregnation of the entire solid material in the first zone I of the reactor, by simply making an appropriate choice of the liquid/solid ratio, of the arrangement of baffles 12 of the length of this zone I and of the speed of rotation of the horizontal tubular reactor, so as to ensure a residence time permitting complete impregnation of all the solid material delivered to the reactor, before it arrives at the inlet of the hydrolysis zone H of the reactor.

Due to this preliminary complete impregnation in combination with the very intimate mixing resulting from the said repeated immersions and intermediate drainings and washings during the rotation of the reactor, the entire divided solid mass may be subjected to the desired treatment under optimum conditions, while it proceeds along the principal hydrolysis zone H of the reactor. The residence time in this zone H corresponds to the duration of the main treatment in the rotating reactor and obviously depends on the rate of longitudinal advancement during the treatment as well as on the length of zone H, in which rotation of the reactor imparts a rotating motion to the divided solid material along a helical path having a length which is many times greater than the axial length of the reactor. The speed of rotation of the reactor evidently determines the number of turns the solid material umdergoes per unit time during its helical path and, consequently, the number of immersion cycles to which it is subjected in the reactor. Thus, by adjusting the speed of rotation of the reactor, it is easy to control the residence time, and hence the number of treatment cycles the solid material undergoes through repeated immersions into the liquid bath, so that it may be caused to undergo the desired treatment in zone H before being discharged from the reactor.

The described construction and the mode of functioning of the rotary horizontal reactor present hardly any limitations with regard to the nature, shape or size of the divided solid material to be treated, so long as the described helical movement can be achieved so as to ensure the desired treatment in each case.

Figure 2:
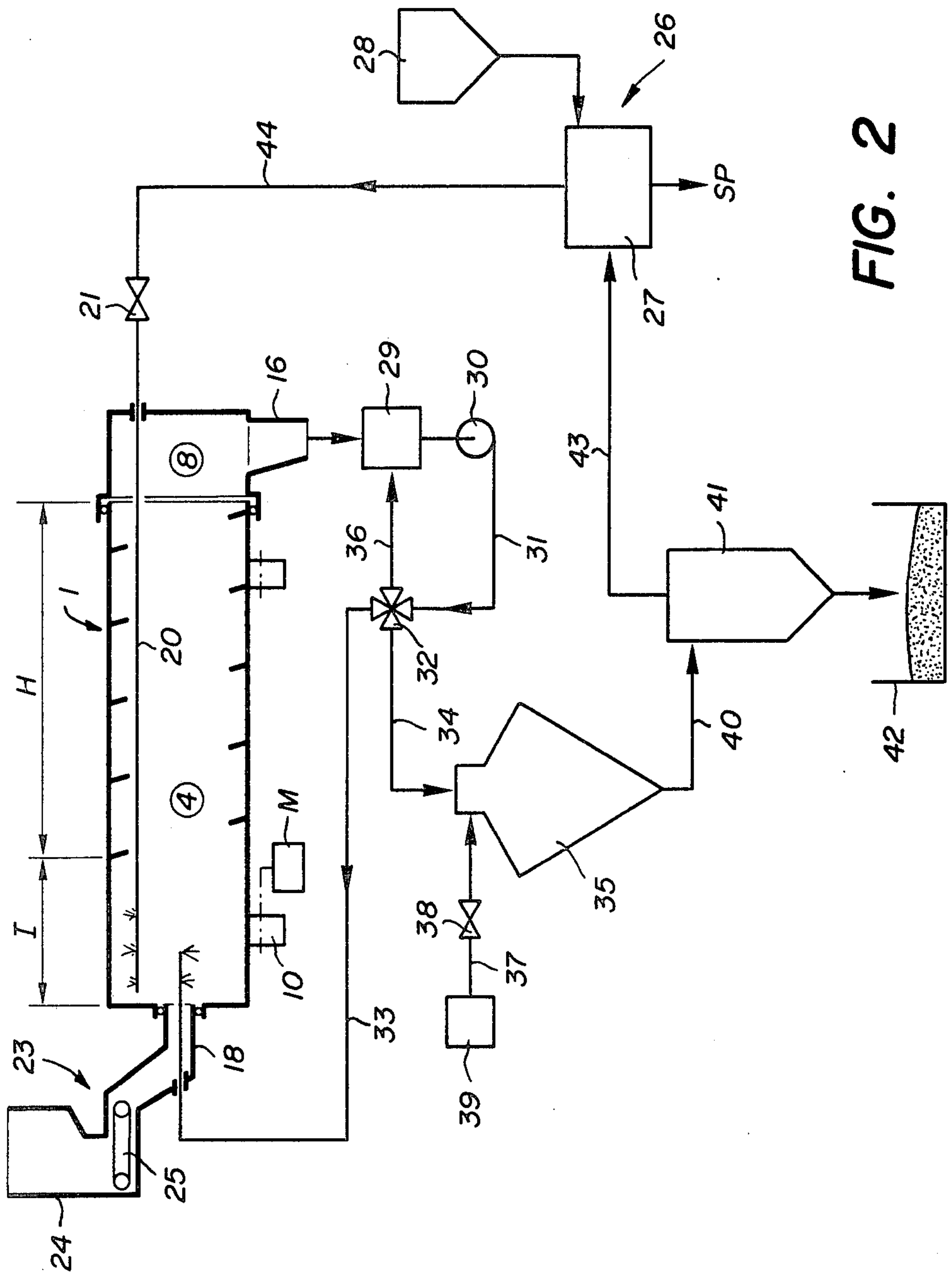
FIG. 2 shows a schematic illustration of a hydrolysis installation comprising a reactor according to FIG. 1.

FIG. 2 schematically illustrates an example of an installation for carrying out a complete acid hydrolysis treatment and thereby producing all sugars obtainable from the plant material to be treated by means of a horizontal rotary reactor of the type described above and shown in FIG. 1.

The divided solid material to be treated is supplied continuously to the reactor by a first feeding device 23 which in this case comprises a feed hopper 24 equipped with a feed-regulating belt 25 disposed before the feed pipe 18 of the reactor. The concentrated liquid acid is supplied continuously to the reactor by a second feeding device 26 which comprises in this case the sprinkler tube 20 described before, means 27 for conditioning the acid in order to adjust it to the desired concentration and a source 28 of fresh liquid acid.

The rotary reactor 1 is driven by an electric motor M with adjustable speed connected to rollers 10 as is indicated schematically in FIG. 2. The belt 25 and the acid valve 21 moreover serve to respectively control the supply of solid material and of acid to the rotary reactor.

The hydrolysis products obtained in this case are in the form of a lignin suspension in an acid solution containing the dissolved sugars formed during the hydrolysis and the vertical collecting pipe 16 discharges this suspension consisting of the hydrolysis products into a buffer tank 29 which is connected with the inlet of a pump 30 for circulating this suspension, the outlet of this pump being connected through a pipe 31 to the inlet of a fourway valve 32 with three outlets. A first outlet of this valve 32 is connected to a recycling pipe 33 for returning one part of the suspension to the inlet of the reactor and a second outlet is connected through a pipe 34 to an evaporator 35 which thus receives a second part of the suspension, while the third outlet of valve 32 is connected to the buffer tank 29 through a return pipe 36 which returns to it the remaining part of the suspension delivered by the pump 30.

This valve 32 thus constitutes a distribution valve which allows direct recycling of a predetermined part of the suspension produced by hydrolysis while another part is sent to the evaporator 35 which serves to separate the sugars formed by hydrolysis.

The evaporator 35 brings the suspension arriving through pipe 34 into direct contact with a hot gas stream which is supplied, via an admission pipe 37 equipped with a control valve 38, by a hot gas generator 39 of conventional type. This evaporator 35 delivers a dry powdered mixture in suspension in a gaseous phase to an inlet pipe 40 of a cyclone 41 which serves to separate the powder mixture which comprises sugars formed by hydrolysis and lignin. This dry powdered mixture coming from cyclone 41 is stored in a vat 42 while the gaseous phase is discharged through a pipe 43 which delivers it continuously to the acid conditioning means 27, which serve to supply concentrated liquid acid continuously to the sprinkler tube 20 by means of a supply pipe 44 and the control valve 21.

The conditioning means 27 comprise means for recovering hydrochloric acid from the gaseous phase coming from cylone 41, means for mixing the acid with make-up acid coming from source 28, in such a way as to produce a liquid hydrochloric acid having a predetermined concentration, which has a value of about 40% in this case, and means for discharging by-products SP of the hydrolysis and evaporation treatment, such as water, acetic acid, formic acid, inert gases, etc.

The described installation of FIG. 2 operates as follows:

The feed-regulating belt 25 and the acid valve 21 are adjusted so that the solid material to be treated and liquid hydrochloric acid at about 40% are supplied to the reactor 1 in a predetermined solid liquid ratio S/L, the optimum value of which may be easily determined by some preliminary tests, for example a ratio of 1:5 when the plant material treated is straw.

The speed of motor M is also adjusted so that the reactor 1 is rotated at a predetermined rate which corresponds to a sufficient residence time of the solid material and of the acid in the reactor before the hydrolysis products are discharged from the reactor to the buffer tank 29.

Pump 30 is continuously operated and the position of valve 32 is adjusted so that it corresponds to a predetermined recycling ratio X, which is the weight ratio between the amount of suspension recycled to the reactor 1 through pipe 33 and the total amount of the suspension discharged from the reactor and delivered by pump 30.

The feed-control valve 38 of the evaporator 35 is further adjusted so as to supply the amount of hot gas which is necessary for evaporating the acid and the water contained in the suspension delivered through the valve 32 to evaporator 35. The acid-conditioning means 27 are moreover controlled so as to continuously deliver the amount of liquid acid which is required to effect hydrolysis in reactor.

Operation of the described installation of FIG. 2 can thus be controlled by relatively simple conventional means (25, 21, 32, 38, M), so as to achieve the best yield of the entire installation with a maximum economy in the energy and fresh acid consumed.

Thus, acid recycling along the closed-loop circuit 1-29-30-32-1 permits the direct and continuous reuse of the liquid acid used for hydrolysis and thus presents important advantages:

Combination of the horizontal rotary reactor with the said closed recycling loop permits very efficient hydrolysis, while considerably reducing the amount of treating liquid required, this being due to efficient operation of the rotary reactor with an acid bath of low volume, while recycling the acid of this bath permits maximum transfer of sugars to the liquid thus ensuring optimum utilization of this liquid before the recovery of the sugars therefrom.

This results in substantial reduction of the total amount of acid used in the installation, of the thermal energy consumed for separating the acid from the sugars and of the cost of conditioning the acid.

These advantages are obtained by a particular combination of relatively simple and inexpensive means which are easy to control and require minimum maintenance.

Figure 3:
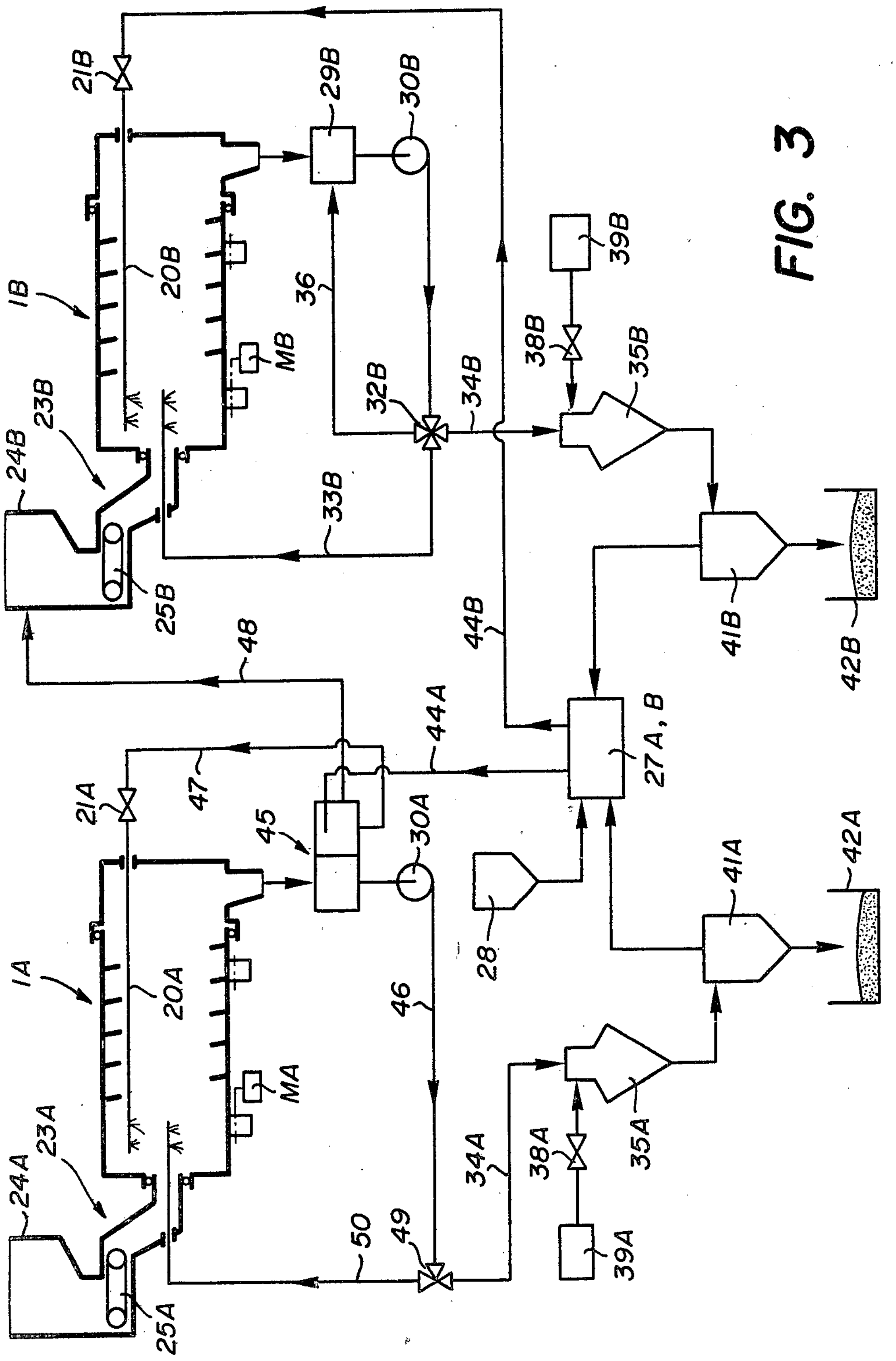
FIG. 3 shows a schematic illustration of a hydrolysis installation comprising two reactors according to FIG. 1 and serving to carry out hydrolysis in two stages.

FIG. 3 represents another example of an installation designed to achieve hydrolysis in two successive stages which are respectively carried out in two rotating reactors 1A and 1B, each of the same type as the described reactor shown in FIG. 1. The second reactor, 1B, is associated with an installation (represented on the right hand of FIG. 3), which is practically identical to the one of FIG. 2.

In this case, common acid-conditioning means 27A,B produce hydrochloric acid at two different concentrations respectively supply acid through feed pipe 44A at a concentration of 32–35% to reactor 1A and through feed pipe 44B at a concentration of about 40% to reactor 1B.

The loose lignocellulosic plant material to be hydrolyzed is supplied continuously by device 23A to the first reactor 1A and the 32–35% liquid acid is supplied to it continuously through sprinkler pipe 20A, so as carry out a selective hydrolysis stage to produce C5-type sugars from the hemicellulose contained in the treated plant material.

The products of this selective hydrolysis are discharged continuously from reactor 1A in the form of a heterogeneous solid/liquid mixture comprising the solid, prehydrolyzed product PPH, consisting substantially of cellulose and lignin, and the liquid acid containing the C5 sugars in solution. This mixture leaving reactor 1A is transferred continuously to a separator-washer 45 which is fed with 32–35% washing acid, coming from the conditioning arrangement 27A, B through pipe 44A and which has three outlet pipes 46, 47 and 48. The outlet pipe 46 of the separator-washer 45 serves to conduct the liquid acid separated from the solid products to the inlet of a three-way valve 49, one of the outlets of this valve being connected to the inlet of reactor 1A by a recycling pipe 50. The outlet pipe 47 serves to remove the 32–35% liquid acid used for washing and to conduct it to the sprinkler pipe 20A of first reactor 1A. The outlet pipe 48 finally serves to evacuate the solid product having undergone separation and washing, and to conduct it to the feed hopper 24B from where it is supplied continuously through feed-regulating belt 25B to the entrance of the second reactor 1B.

Three-way valve 49 constitutes a distribution valve for recycling a predetermined part of the separated liquid delivered to outlet pipe 46 by pump 30A, while the rest of this liquid is through pipe 34A to evaporator 35A connected to cyclone 41A, in order to recover the C5 sugars which are formed by selective hydrolysis in reactor 1A and stored in vat 42A.

The separator-washer 45 which is represented very schematically on FIG. 3 can be arranged as a filter press with moving belts, having a separation part followed by a washing part. It is understood that the outlet pipes 47 and 48 may also be connected to transporting means (not represented) such as a pump for the circulation of the washing acid in pipe 47. When outlet pipe 48 may be arranged above the hopper 24B, the prehydrolyzed solid product can be transferred by gravity, but it is understood that any appropriate conveyor means can be associated with pipe 48 to ensure continuous transfer to this hopper 24B.

The installation associated with the second rotary reactor 1B is designed and operated in the same manner as described with reference to FIG. 2, except that the second reactor 1B is fed with the prehydrolyzed solid product and serves to carry out said second stage of the hydrolysis.

The described installation of FIG. 3 is operated as follows:

Continuous feeding of the first reactor 1A with 32–35% acid permits the production of C5 sugars only and thus their direct recovery in vat 42A. The reactor 1A and its auxiliary equipment (Ma, 25A, 21A, 49, 38) are controlled for this purpose in more or less the same manner as in the installation according to FIG. 2, so as to obtain essentially the same advantages previously described. However, it is understood that the necessary reaction time for carrying out the selective hydrolysis stage will be shorter than for complete hydrolysis, so that the length of reactor 1A and the capacity of its auxiliary equipment may be reduced accordingly, which constitutes a particularly important advantage for the hydrolysis of very large amounts of plant material.

The second reactor 1B fed with acid at about 40% thus only serves to treat the prehydrolyzed solid products in order to produce only C6 sugars (i.e. sugars with 6 carbon atoms per molecule or hexoses) and to thus recover them directly with the lignin in vat 42B. For that purpose, this reactor 1B and its auxiliary equipment are controlled as already described in order to obtain the same advantages previously mentioned. The C6 sugars thus obtained in vat 42B may be separated fairly easily from the lignin by dissolving them in any appropriate solvent such as water for example.

Hydrolysis carried out in the described installation of FIG. 3 thus permits the production of the different C5 and C6 sugars in two distinct stages, thus obviating the necessity of a subsequent separation of these sugars, besides the technological and economic advantages already mentioned.

The following examples illustrate how the installations described above with reference to FIGS. 1 to 3 may be used to carry out the invention.

EXAMPLE 1

Hydrolysis is carried out in a rotary reactor according to FIG. 1 having a diameter of 60 cm and a length of 205 cm and forming part of an installation according to FIG. 2. The plant material to be treated consists of straw with 10% moisture, which is supplied to the reactor 1 at a rate of 10 kg/h.

Total hydrolysis is carried out by supplying the reactor 1 with 40% hydrochloric acid at 30° C. (density about 1.2) at a rate of 49 l/h which corresponds to a ratio by weight of solid to liquid of about 1:6 (including the 1 kg of water in the straw). The reactor 1 is rotated at one revolution per minute.

The impregnation zone I has a length of 60 cm and contains two rows of eight paddles 12 (FIG. 1), the residence time of the straw in this zone I being in this case about 20 to 25 minutes, which insures complete impregnation of the straw by the acid while the hemicellulose and the cellulose contained therein are partly dissolved in the acid bath L.

The hydrolysis zone H of the reactor in this case has a length of 145 cm, and contains 36 paddles 12 distributed between four and a half turns of a helical baffle 13, the radial height of which is 8 cm. Since acid bath L is formed on the bottom of the reactor along zones I and H due to the presence of the helical baffle 13, the maximum depth of this bath will be equal to the radial height of this baffle (8 cm) so that its volume will then be equal to or less than about 50 liters.

The impregnation zone I produces a mixture which then moves slowly at a constant rate of about 300 cm/h along the hydrolysis zone H, the mean residence and treatment time in the rotating reactor 1 being about 1 hour in this case.

At the outlet of the reactor the hydrolysis products are discharged in the form of a liquid slurry of insoluble solid residues (lignin, mineral compounds such as silica) in suspension in the acid containing the dissolved sugars formed by hydrolysis, with a relatively high sugar content (126 g/l) which is already sufficiently high to be of interest for recovery of the sugars in evaporator 35 and cyclone 41 (see FIG. 2).

However, in order to improve the economy of the installation, a part of this hydrolysis slurry is recycled in the reactor to increase its sugar content to a predetermined value, the total amount of liquid acid supplied to the reactor being maintained constant by reducing the amount of acid supplied through the sprinkler pipe 20, this reduction being equal to the amount of acid recycled by means of slurry. Thus, in this case direct recycling of 50% by weight (about 30 kg/h of acid) of the slurry leaving the reactor, provides an increase of the dissolved-sugar content of the acid up to 250 g/l. The concentration of the acid contained in the reactor thus always remains greater than 39%, whereby to ensure complete hydrolysis. The amount of heat supplied to evaporator 35 per unit weight of sugar recovered by evaporating the acid, may thus be reduced by a factor of about 2 by thus increasing the sugar content of the acid due to recycling as described.

EXAMPLE 2

Hydrolysis is carried out in two stages in an installation according to FIG. 3.

The first reactor 1A is supplied with 10 kg/h of straw containing 10% moisture for prehydrolysis treatment carried out with 49 liters/hour of 33% (density 1,16) liquid hydrochloric acid so that the ratio of straw/acid in the reactor is thus about 1:6 by weight (including the 1 kg of water in the straw). This reactor is rotated at one revolution per minute and the residence time and the time of treatment of the straw by the acid in the reactor 1A is approximately one hour.

Reactor 1A delivers about 70 kg/h of prehydrolysis products discharged in the form of a solid/liquid mixture containing the solid residue of the prehydrolyzed straw (cellulose, lignin, mineral compounds) and liquid acid containing the dissolved sugars (pentoses) formed by prehydrolysis. The prehydrolyzed mixture thus obtained is conducted continuously to the separator-washer 45 (FIG. 3) in order to separate 6 kg/h of prehydrolyzed solid straw (containing 6 liters of liquid acid), which is delivered continuously to the feed hopper 24B of the second reactor 1B.

The separator-washer 45 comprises on one hand separating means, in this case a centrifugal dryer which delivers 44 liters per hour of liquid acid separated from the prehydorlysis mixture to valve 49 through pump 30A and pipe 46 and on the other hand washing means which continuously deliver acid at about 37% having served for washing to the sprinkler tube 20A of the first reactor 1A.

The total amount of acid discharged from the reactor and separated from the prehydrolyzed mixture, namely 44 liters/hour, is recycled through pipe 50 when starting operation, the amount of acid delivered by the sprinkler 20A then being 5 liters/hour, in order to provide the necessary amount of make-up acid to maintain the total amount of acid supplied to reactor 1A at 49 liters/h and the solid/liquid ratio at the same value of 1:6 by weight (including 1 kg of water of the straw). The initial recycling ratio in the reactor 1A thus corresponds to 44/50=0.88 and the initial concentration of the sugars (pentoses) dissolved in the acid leaving the reactor 1A corresponds in this case to 59 g/l, the straw to be hydrolyzed containing in this case 26% by weight of pentosans (hemicellulose).

Due to said initial total recycling of the acid (44 l/h) leaving the reactor 1A, the concentration of sugar in this acid is rapidly increased from 59 to 150 g/l during the three first cycles after starting up this reactor.

Continuous operation of the reactor 1A under stationary conditions is next obtained by reducing the recycling ratio from 0.88 to about 0.6 in order to maintain the sugar concentration in the acid at this value of 150 g/liter, about 30 liters/h of acid being recycled to reactor 1A and 19 liters/h of acid being supplied by sprinkler 20A, in this case so as to feed this reactor with 49 liters/h of acid during normal continuous operation.

Consequently, it is necessary to deliver only 14 l/h of nonrecycled acid via valve 49 to evaporator 35A so that the cost of recovery of the sugars may be reduced by a factor of 2.54 due to such recycling during continuous operation.

However, one can envisage increasing the sugar concentration in the acid well above the value of 150 g/liter indicated above as an example, in order to achieve an even greater economy.

Now, in order to maintain the acid concentration in the reactor 1A at 33%, the make-up acid, which is delivered by sprinkler tube 20A after having served for washing in the separator-washer 45, is provided by the acid conditioning means 27A, B at a concentration of about 37% in order to compensate the subsequent dilution of the acid by the water transferred from the straw having 10% moisture content, during its treatment in reactor 1A.

The prehydrolysis treatment as described permits one to obtain 2.1 kg/h of sugars of the C5 type (pentoses) in vat 42A.

The prehydrolyzed and washed straw thus obtained, which contains 70% of cellulose by weight and 1 liter of acid (at about 37%) per kg, is then delivered continuously (6 kg/h) from the hopper 24B to reactor 1B, in which it is subjected to a treatment serving to hydrolyze cellulose with hydrochloric acid at about 39%. For this purpose, 18 liters/h of 40% hydrochloric acid at 30° C. are delivered from the acid conditioning means 27A,B to the reactor 1B by the sprinkler tube 20B.

Thus reactor 1B receives 6 kg/h of prehydrolyzed straw and 18 l/h of 40% hydrochloric acid which permits one to maintain a concentration of the acid in this reactor at a value greater than 39% and thus ensure the hydrolysis of cellulose.

The solid/liquid ratio in this reactor is thus about 1:5 by weight and permits complete hydrolysis of the cellulose (70% by weight) contained in the prehydrolyzed straw, which corresponds to 4.2 kg/h of C6 sugars (hexoses) dissolved in 24 liters of acid, or a concentration of at least 175 g/liter, such a sugar concentration in the acid being of sufficient interest for an economical recovery of the sugars with the aid of evaporator 35B.

This reactor 1B and the installation associated with it (at the right FIG. 3) are in this case operated in more or less the same way as has already been described in Example 1 with reference to FIG. 2.

In order to further increase the concentration of the C6 sugars in the acid up to a value of 262 g/liter, the hydrolysis slurry is recycled in the reactor 1B in the manner described in Example 1, but with a recycling ratio of 33% in this case.

One thus obtains 4.2 kg/h of C6 sugars dissolved in the hydrolysis slurry which is delivered to evaporator 35B where a powdery mixture of sugars and lignin are produced.

It is understood that a tubular rotary reactor such as that described above as an example with reference to the drawing may have any appropriate diameter from a few decimeters to a few meters, while its length may attain 10 to 20 meters if necessary. Such a tubular reactor may be rotably driven at a speed which can be controlled over a relatively wide range, for example from 1 to 10 rpm, or even higher.

It is also understood that various modifications of the form of the embodiments and operating conditions described above as examples may be envisaged, while obtaining essentially the same advantages when carrying out the present invention.

What we claim is:

1. A process for continuously producing sugars by hydrolyzing lignocellulosic material with concentrated aqueous hydrochloric acid in a horizontal rotating tubular reactor which comprises the steps of:
   (a) feeding concentrated aqueous hydrochloric acid to the reactor and forming a liquid bath in the bottom thereof,
   (b) feeding lignocellulosic material to one end of the reactor,
   (c) cyclically immersing said material in said acid bath while removing and draining a part of said material between consecutive immersions thereof by rotating the reactor,
   (d) continuously and simultaneously with said immersing step conveying said material along the length of the reactor; and
   (e) continuously discharging solid residue and liquid acid containing sugars by gravity from the opposite end of the reactor.

2. The process of claim 1, which comprises recycling at least a part of the acid having served for hydrolysis and discharged from the reactor for further use in the hydrolysis process.

3. The process of claim 1, wherein the material to acid ratio in the reactor is between 1:5 and 1:10 by weight.

4. The process of claim 1, wherein the hydrochloric acid has a concentration less than 37% by weight, whereby selective hydrolysis of the hemicellulose fraction of the material is effected and whereby a lignocellulose fraction that has retained substantially the same physical form as the lignocellulosic material fed to the reactor is discharged from the reactor.

5. The process of claim 1 including dividing said lignocellulosic material into fragments during passage through the reactor, the greatest dimension of which is no greater than ⅓ of the internal diameter of the tubular reactor.

6. The process of claim 1 wherein the hydrolysis is carried out in two successive rotating tubular reactors and includes the step of feeding the solid residue discharged from the first reactor to a second reactor for further hydrolysis.

7. The process of claim 6, wherein the hydrochloric acid in the first reactor has a concentration of from about 30% to 37% by weight and a heterogeneous mixture comprising a solid nonhydrolyzed lignocellulose fraction mixed with concentrated acid containing sugars formed in the first reactor is discharged therefrom, including separating the lignocellulose fraction from said mixture, washing the fraction with hydrochloric acid at a concentration of about 33–37% by weight and feeding the washed fraction to the second reactor containing hydrochloric acid with a concentration of from 39% to 41% by weight, whereby substantially complete hydrolysis of the lignocellulose fraction is effected thus forming in the second reactor a lignin suspension in concentrated acid containing the dissolved sugars formed during said complete hydrolysis.

8. The process of claim 1, wherein the hydrochloric acid has a concentration of from about 39 to 41% by weight and a suspension of lignin in the hydrochloric acid containing dissolved sugars is discharged from the reactor including drying the resulting suspension by direct contact with a hot gas flow in an evaporator to provide a powder mixture comprising lignin and the sugars formed by hydrolysis.

9. The process of claim 8, including separating the sugars from said powder mixture by taking up this mixture with water.

* * * * *